UNITED STATES PATENT OFFICE.

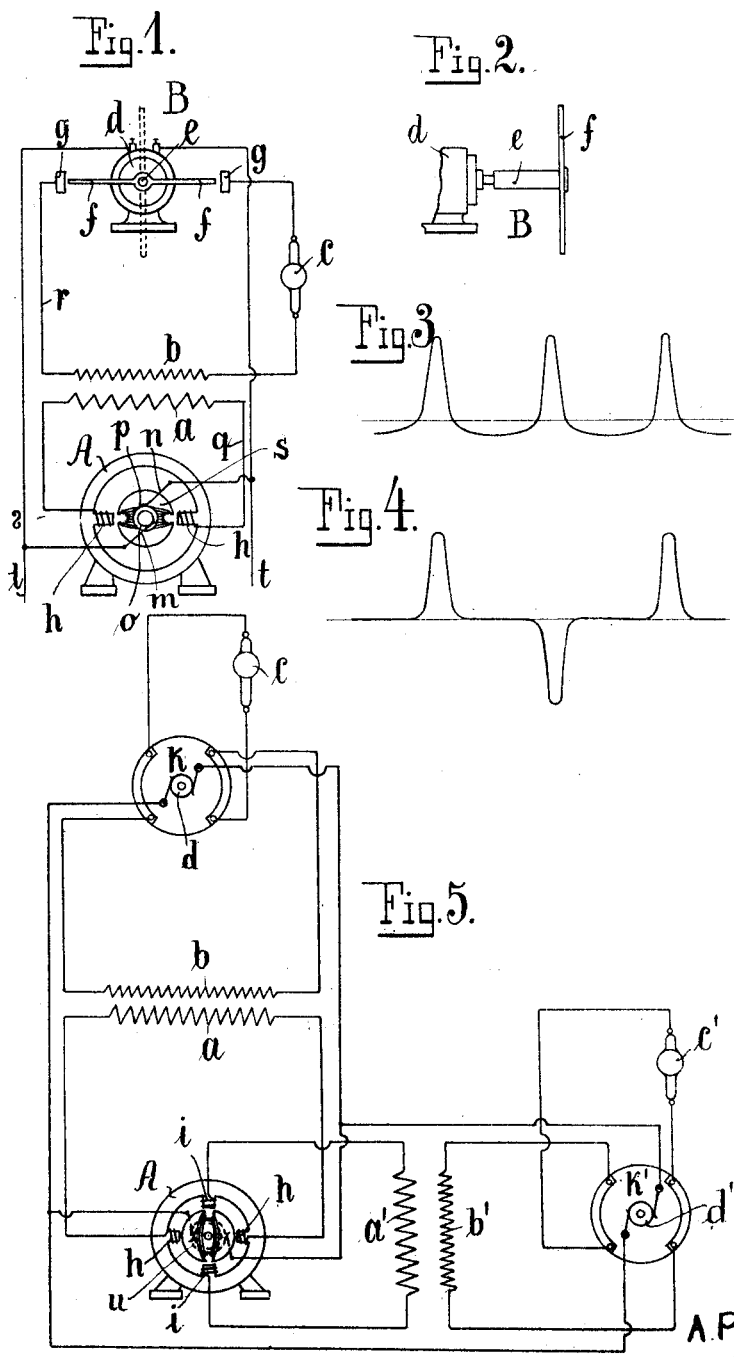

ADOLF PFEIFFER, OF BERLIN, GERMANY, ASSIGNOR TO ELECTRICITÄTSGESELLSCHAFT "SANITAS" M. B. H., OF BERLIN, GERMANY, A FIRM.

ARRANGEMENT FOR PRODUCING SHORT UNIDIRECTED HIGH-TENSION-CURRENT IMPULSES.

1,199,494.  Specification of Letters Patent.  Patented Sept. 26, 1916.

Application filed September 30, 1915. Serial No. 53,380.

*To all whom it may concern:*

Be it known that I, ADOLF PFEIFFER, engineer, a subject of the Emperor of Germany, and residing at 23 Rathenowerstrasse, Berlin, Germany, have invented certain new and useful Improvements in Arrangements for Producing Short Unidirected High-Tension-Current Impulses, of which the following is a specification.

For producing short unidirected high tension current impulses, for example for working X-ray tubes, as a rule short sections of a sinoidal alternating current, transformed to a high tension, are cut out for utilization from the maxima of the individual waves by aid of a rectifier reversing the negative waves. As this cutting out proceeds at a high tension, there will always be a strong sparking, so that the break will in fact not occur at the desired moment. For avoiding this drawback it has been proposed to produce by means of a specially designed electro-magnetic machine a primary current with short, steep waves and to transform this current to a high tension, so that short impulses are also produced in the high tension circuit. Such electric current, the serviceable period of which is small in proportion to the periodic time, shall, hereinafter, be termed "impulse current". When the said electro-magnetic machine produces an asymmetrical impulse current, that is to say a current with one sided points, there will be long shallow negative current waves between the said points. The negative current waves will, of course, become correspondingly higher in the transformed high tension current, and may, in working X-ray tubes, lead to the forming of the unwelcome "closing-light". According to the present invention this drawback may be avoided by the machine being coupled with a switch, running synchronously therewith in the high tension circuit, which switch will break the high tension current feeding the X-ray tube close to the zero line after each positive impulse and keep it broken for the period of the following negative current wave, thus completely cutting out the noxious negative waves. When a machine is employed, which produces a symmetrical impulse current, that is to say, a current with alternately positive and negative points, between which there are lengthy breaks, the negative waves may, by means of a rectifier of a known type, disposed in the high tension circuit, be reversed, and this reversal will here be performed under particularly favorable conditions, because the rectifier need not cut out curve sections from the wave maximum any more and the break may always occur at the tension zero, and all sparking is avoided.

In the accompanying drawing a constructional form is exemplified in Figures 1 and 2, Fig. 1 being a full view of the arrangement, and Fig. 2 a side elevation of the switch. Fig. 3 is a diagram of an asymmetrical impulse current; Fig. 4 is a diagram of a symmetrical impulse current; Fig. 5 is another exemplification, in which one machine feeds two circuits.

With the arrangement according to Fig. 1 an electro-magnetic machine A is provided for producing the impulse passing through the primary winding $a$ of a transformer $a$—$b$; in the said electro-magnetic machine the tips of the two poles of the armature approach each other closely, while the iron cores of the induced coils $h$, $h$ extend only along a fraction of the face of the pole shoes of the armature. As a change in the magnetization of the iron cores of the induced coils $h$, $h$ occurs only at the moment of the passing of the pole tips of the armature before the coils $h$, $h$, and as this change in the magnetization occurs very suddenly, two short current impulses are thus obtained at each revolution of the armature.

With Fig. 1 it has been assumed that the excitation of the armature $s$ is caused by a sinoidal alternating current derived from the lines $t$ and of a periodicity corresponding to the number of revolutions of the machine, which alternating current is supplied by means of brushes $m$, $n$ to the rings $o$, $p$ connected to the ends of the armature winding. With such mode of excitation, owing to which at the passing of a pair of points before the coils the exciting current has each time changed its tension indices, an always uniform change of the magnetic condition in the iron cores of the induced coils $h$, $h$ is obtained, so that in the circuit $q$ fed by the coils $h$, $h$ unidirected impulses, according to Fig. 3, will result. Between these are formed shallow negative current waves in consequence of the gradual change in the magnetic condition of the armature proceeding under the influence of the sinoidal exciting current.

In the circuit $r$ of the secondary winding $b$ of the transformer are disposed, besides an X-ray tube $c$, a switch B with a double-armed switch lever $f$ fitted to the shaft $e$ of a motor $d$, and two contacts $g$, $g$. The motor $d$ is connected to the exciting circuit of the machine A, so that it runs synchronously with the same. The contacts $g$ are so adjusted and dimensioned that the make-positions for the current coincide, as regards their timing, with the short, high current impulses, and the breaks with the respective negative tensions of the machine circuit, so that the break occurs at 0-tension, and the whole of the negative waves is cut out, whereby sparking is avoided. At the rate at which, after the break, the negative tension of the current rises, the switch arms $f$, $f$ move farther and farther away from the contacts $g$, $g$ until they reach the intermediate position shown by dotted lines in Fig. 1, when the maximum of the negative tension is attained, at which position, owing to the great distance, it is impossible for sparks to jump across and for a negative current in consequence to pass through the tube.

The machine A may be driven in any suitable manner, only the drive must be synchronous with the exciting alternating current. When the machine A is driven by mechanical means or by a direct current motor, the synchronism is, preferably, secured by disposing on the driving shaft of the machine A a small alternating current generator, to which the exciting winding of the machine A as well as the motor $d$ of the switch are connected. The drive of the switch may, however, also be derived mechanically from the shaft of the machine A, either by direct coupling or by means of a gearing. When the machine A is excited by direct current, a symmetrical impulse current according to Fig. 4 is obtained, that is to say, a current with alternately positive and negative points and lengthy intervals therebetween. The current in the high tension circuit $r$ proceeds accordingly. In this case a rectifier $k$ of a known type is substituted for the switch, as indicated diagrammatically in Fig. 5, which rectifier may be synchronously driven by means of a motor $d$ connected to an alternating current generator $u$ arranged on the shaft of machine A. The combination of a rectifier with the machine shown affords the advantage that, on the one hand, the rectifier no more serves to cut out sections of the curve at the wave maxima, but only for reversing the negative current waves, and that owing to the wide limits available, the reversing will always occur at a tension zero without any need of an accurate regulation.

The machine A shown in Fig. 5 has two pairs of induced coils $h$, $h$ and $i$, $i$, respectively, of which pairs of coils each feeds a separate transformer $a$—$b$ and $a'$—$b'$ respectively. In each of the circuits fed by the high tension windings of the transformers is disposed an X-ray tube $c$ and $c'$, respectively, and a rectifier $k$ and $k'$, respectively, the rectifier $k'$ being also driven by a motor $d'$, connected to the generator $u$. The rectifiers are here also necessary in the case, that the machine is excited by alternating current, because an alternating current of double the number of cycles must be used for the excitation. Instead of two pairs of coils, of course, also a larger number may be employed, in order to feed a correspondingly larger number of circuits.

I claim:

1. Arrangement for producing short unidirected high tension current impulses, comprising a machine generating waves whose serviceable portion is a fraction of the periodic time, a high tension transformer with a primary winding fed by said machine and a secondary winding connected to a circuit including a device for utilizing the high tension current impulses produced in the secondary winding and a power driven switch, and means to drive said switch synchronously with said machine.

2. Arrangement for producing short unidirected high tension current impulses, comprising a machine generating waves whose serviceable portion is a fraction of the periodic time, a high tension transformer with a primary winding fed by said machine and a secondary winding connected to a circuit including a device for utilizing the high tension current impulses produced in the secondary winding and a power driven switch connected to a motor synchronized with said machine.

3. Arrangement for producing short unidirected high tension current impulses, comprising a machine generating waves whose serviceable portion is a fraction of the periodic time and the exciting winding of which is connected to an alternating current circuit, a high tension transformer with a primary winding connected to a circuit including a device for utilizing the high tension current impulses produced in the secondary winding and a switch being in operative connection with a motor connected to the exciting circuit of the machine.

4. Arrangement for producing short unidirected high tension current impulses, comprising a machine generating symmetrical waves whose serviceable portion is a fraction of the periodic time, a high tension transformer with a primary winding fed by said machine and a secondary winding connected to a circuit including a device for utilizing the high tension current impulses produced in the secondary winding and a power driven rectifier, and means to drive said rectifier synchronously with said machine.

5. Arrangement for producing short unidirected high tension current impulses, comprising a machine generating symmetrical waves whose serviceable portion is a fraction of the periodic time, a high tension transformer with a primary winding fed by said machine and a secondary winding connected to a circuit including a device for utilizing the high tension current impulses produced in the secondary winding and a rectifier being in operative connection with a motor synchronized with said machine.

6. Arrangement for producing short unidirected high tension current impulses, comprising an impulse current machine with several out-of-phase induced windings, several high tension transformers with their primary windings fed by the several windings of the machine and their secondary windings connected to circuits including devices for utilizing the high tension current impulses produced in the secondary windings, a rectifier in each of said circuits, and means to drive said rectifiers synchronously with said machine.

In witness whereof I have hereunto set my hand in the presence of two witnesses.

ADOLF PFEIFFER.

Witnesses:
  AUGUST TRAUTMANN,
  HENRY HASPER.